United States Patent
Allen et al.

(10) Patent No.: US 10,043,203 B2
(45) Date of Patent: Aug. 7, 2018

(54) METHOD, MEDIUM, AND SYSTEM FOR CO-LOCATING SUBJECT-RELATED PERSONS

(71) Applicant: INTERNATIONAL BUSINESS MACHINES CORPORATION, Armonk, NY (US)

(72) Inventors: Corville O. Allen, Morrisville, NC (US); Richard G. Bowers, Raleigh, NC (US); Lisa M. W. Bradley, Cary, NC (US); Henri F. Meli, Cary, NC (US); Gerald G. Tomkins, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 14/637,750

(22) Filed: Mar. 4, 2015

(65) Prior Publication Data

US 2016/0260144 A1 Sep. 8, 2016

(51) Int. Cl.
*G06Q 30/00* (2012.01)
*G06Q 30/06* (2012.01)
*G01S 19/14* (2010.01)

(52) U.S. Cl.
CPC ......... *G06Q 30/0605* (2013.01); *G01S 19/14* (2013.01); *G06Q 30/0639* (2013.01)

(58) Field of Classification Search
CPC . G06Q 30/0605; G06Q 30/0639; G01S 19/14
See application file for complete search history.

(56) References Cited

U.S. PATENT DOCUMENTS 5,961,572 A * 10/1999 Craport ............... G01S 5/00
340/990
5,978,747 A * 11/1999 Craport ............... G01C 21/00
340/988

(Continued)

FOREIGN PATENT DOCUMENTS

KR 1020090043730 5/2009
WO 2013130455 9/2013

OTHER PUBLICATIONS

Anonymous, "Method to Introduce Crowdsourcing to In-Store Product Help in Order to Increase Customer Engagement", IP.com, IPCOM000217099D, May 2, 2012, pp. 1-2. (Year: 2012).*

(Continued)

*Primary Examiner* — Matthew E Zimmerman
(74) *Attorney, Agent, or Firm* — Law Office of Jim Boice

(57) ABSTRACT

Electronic sensors co-locate two subject-related persons. A first positioning system on a first communication device determines a first location of a first person within a physical retail store at which a particular type of product is displayed. The first communication device receives a message from a second communication device describing a second location of a second person, who has been predetermined to have used the particular type of product that is displayed at the first location. The first communication device transmits a message to the second communication device requesting that the second person meet the first person at the first location to discuss products being displayed at the first location. The first communication device receives a responsive message indicating an agreement from the second person to meet the first person at the first location, and then transmits, to the second communication device, navigational directions from the second location to the first location.

18 Claims, 3 Drawing Sheets

(56) References Cited

U.S. PATENT DOCUMENTS

| | | | |
|---|---|---|---|
| 7,120,647 B2 | 10/2006 | Venkatesh et al. | |
| 8,046,272 B1 | 10/2011 | Nguyen | |
| 2010/0208028 A1 | 8/2010 | Lauffer | |
| 2014/0207614 A1* | 7/2014 | Ramaswamy | G06Q 30/0613 705/26.41 |
| 2014/0214605 A1* | 7/2014 | Argue | G06Q 30/0639 705/26.9 |
| 2014/0214612 A1* | 7/2014 | Argue | G06Q 30/0613 705/26.41 |
| 2014/0244437 A1* | 8/2014 | Longino | G06Q 30/0613 705/26.41 |
| 2014/0344011 A1* | 11/2014 | Dogin | G06Q 20/12 705/7.29 |
| 2014/0365334 A1* | 12/2014 | Hurewitz | G06Q 30/0613 705/26.41 |
| 2015/0025929 A1* | 1/2015 | Abboud | G06Q 30/0613 705/7.15 |

OTHER PUBLICATIONS

Anonymous, "Method to Introduce Crowdsourcing to In-Store Product Help in Order to Increase Customer Engagement", IP.com, IPCOM000217099D, May 2, 2012, pp. 1-2.

IBM, "System and Method to Provide In-Store First Impressions to Online Shoppers", IP.com, IPCOM000179917D, Mar. 2, 2009, pp. 1-3.

* cited by examiner

METHOD, MEDIUM, AND SYSTEM FOR CO-LOCATING SUBJECT-RELATED PERSONS

BACKGROUND

The present disclosure relates to the field of electronic communication devices, and specifically to the use of electronic communication devices that are capable of determining their physical locations. Still more particularly, the present disclosure relates to electronic communication devices that facilitate persons having a common interest in one or more products to meet in person.

SUMMARY

In an embodiment of the present invention, a method and/or computer program product enable electronic sensors to co-locate two subject-related persons. A first positioning system on a first communication device determines a first location of a first person who is using the first communication device. The first location is a location within a physical retail store at which a particular type of product is displayed. A message receiver on the first communication device receives a message from a second positioning system on a second communication device describing a second location of a second person. The second person has been predetermined to have used a product from the particular type of product that is displayed at the first location. A message transmitter on the first communication device transmits a message to the second communication device requesting that the second person meet the first person at the first location to discuss one or more products being displayed at the first location. The message receiver on the first communication device receives a responsive message from the second communication device indicating an agreement from the second person to meet the first person at the first location. The message transmitter on the first communication device transmits, to the second communication device, navigational directions from the second location to the first location.

In an embodiment of the present invention, a communication device comprises a first positioning system, a message receiver, and a message transmitter. The first positioning system on a first communication device determines a first location of a first person who is using the first communication device. The first location is a location within a physical retail store at which a particular type of product is displayed. The message receiver on the first communication device receives a message from a second positioning system on a second communication device describing a second location of a second person. The second person has been predetermined to have used a product from the particular type of product that is displayed at the first location. The message transmitter on the first communication device transmits a message to the second communication device requesting that the second person meet the first person at the first location to discuss one or more products being displayed at the first location. The message receiver on the first communication device receives a responsive message from the second communication device indicating an agreement from the second person to meet the first person at the first location. The message transmitter on the first communication device then transmits, to the second communication device, navigational directions from the second location to the first location.

DETAILED DESCRIPTION

Figure 1:
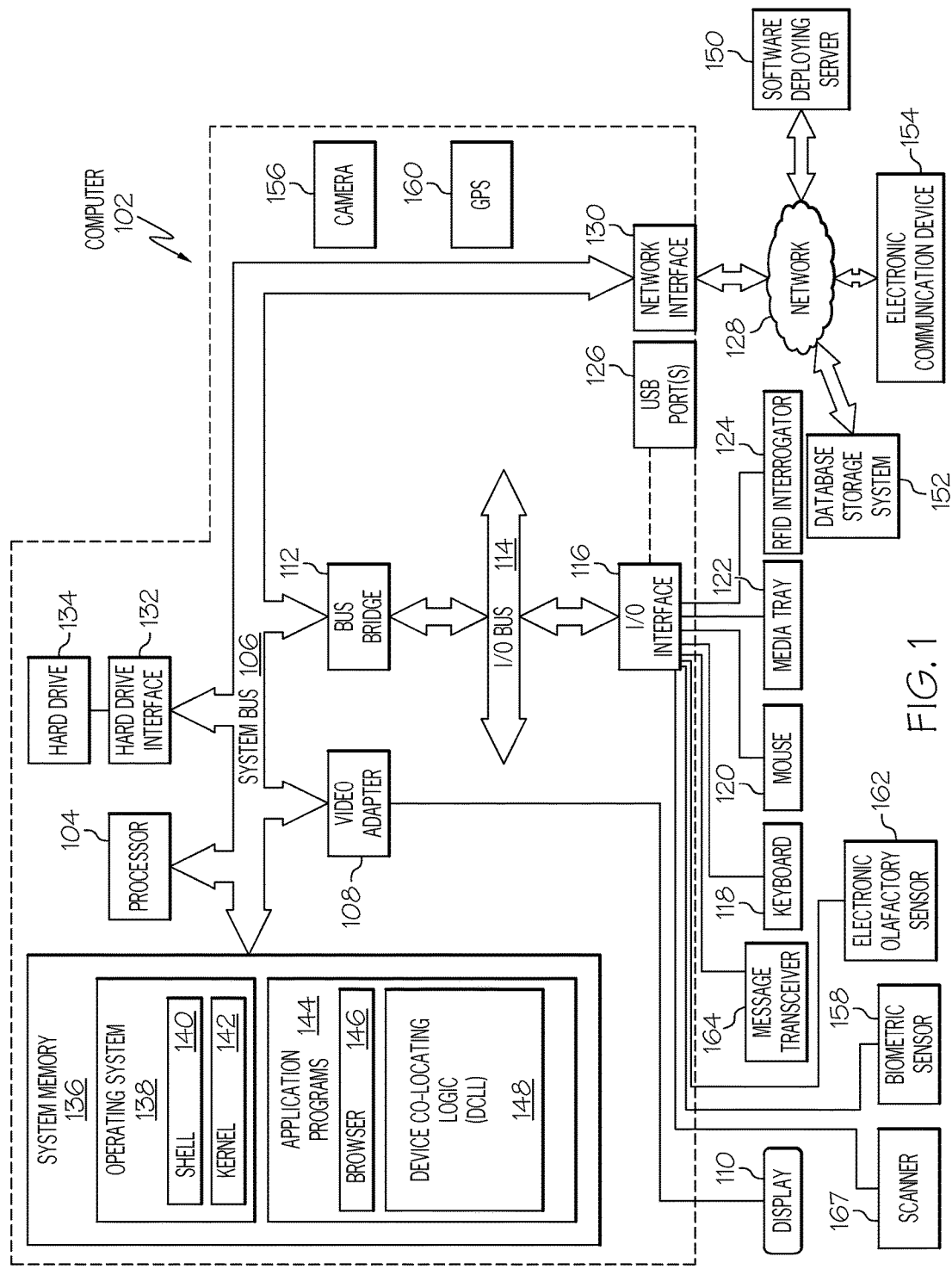
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or data storage system 152 and/or electronic communication device 154 shown in FIG. 1, as well as first communication device 202, second communication device 254, and/or supervisory system 206 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, electronic communication device 154, and/or database storage system 152 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a device co-locating logic (DCLL) 148. DCLL 148 includes code for implementing the processes described below, including those described in FIGS. 2-3. In one embodiment, computer 102 is able to download DCLL 148 from software deploying server 150, including in an on-demand basis, wherein the code in DCLL 148 is not downloaded until needed for execution. In one embodiment of the present invention, software deploying server 150 performs all of the functions associated with the present invention (including execution of DCLL 148), thus freeing computer 102 from having to use its own internal computing resources to execute DCLL 148.

Also within computer 102 is a camera 156, which is capable of capturing still photos or moving video, preferably in a digital format such as a joint photographic experts group (JPEG) format or a moving picture experts group (MPEP) format.

Another component that may be part of computer 102 is a radio frequency identifier (RFID) interrogator 124, which may interface with I/O interface 116 as depicted, or may directly interface with system bus 106. RFID interrogator 124 includes a transceiver that transmits interrogative signals to an RFID chip (either chipped or chipless), and then receives a responsive signal from the RFID chip that includes unique identification information contained within the RFID chip. This unique identification information provides information about a location and/or object to which the RFID chip is affixed/located.

Also within computer 102 is at least one biometric sensor 158. Examples of biometric sensor 158 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), pupil dilation detector (e.g., used with camera 156 to capture an image of the user/holder's eye pupils to indicate various emotions that are known to be associated with pupil dilation and/or pupil contraction), a microphone (e.g., to detect a breathing pattern of the holder of an electronic device such as a smart phone), etc. Thus, biometric sensor 158 is an electronic device for gathering biometric data associated with a human. Biometric data is data describing a physiological state, physical attribute, or measurement of a physiological condition of a person.

Another component of computer 102 in one or more embodiments is an electronic olfactory sensor 162, which is able to detect airborne chemicals and/or airborne odor causing elements, molecules, gases, compounds, and/or combinations of molecules, elements, gases, and/or compounds in an air sample, such as, without limitation, an airborne chemical sensor, a gas detector, and/or an "electronic nose" (which detects and differentiates various odorants). In one embodiment, electronic olfactory sensor 162 is implemented as an array of electronic olfactory sensors and a pattern recognition system that detects and recognizes odors and identifies olfactory patterns associated with different odor causing particles. The array of electronic olfactory sensors may include, without limitation, metal oxide semiconductors (MOS), conducting polymers (CP), quartz crystal microbalance, surface acoustic wave (SAW), and field effect transistors (MOSFET). The particles detected by a set of chemical sensors may include, without limitation, atoms, molecules, elements, gases, compounds, or any type of airborne odor causing matter. Electronic olfactory sensor 162 detects the particles in the air sample and generates olfactory pattern data, which may be stored in database storage system 152.

In one or more embodiments of the present invention, computer 102 may include a positioning system, such as the depicted global positioning system (GPS) 160, which is a space-based satellite navigation system that provides location information for a GPS-enabled device, such as a smart phone. In another embodiment, the positioning system is a positioning system that utilizes signals from local transmitters. These local signals are triangulated to determine the real-time position/location of computer 102.

In one or more embodiments of the present invention, computer 102 includes a message transceiver 164, which is capable of sending and receiving electronic messages via a radio frequency (RF) signal, a Wi-Fi signal, etc.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
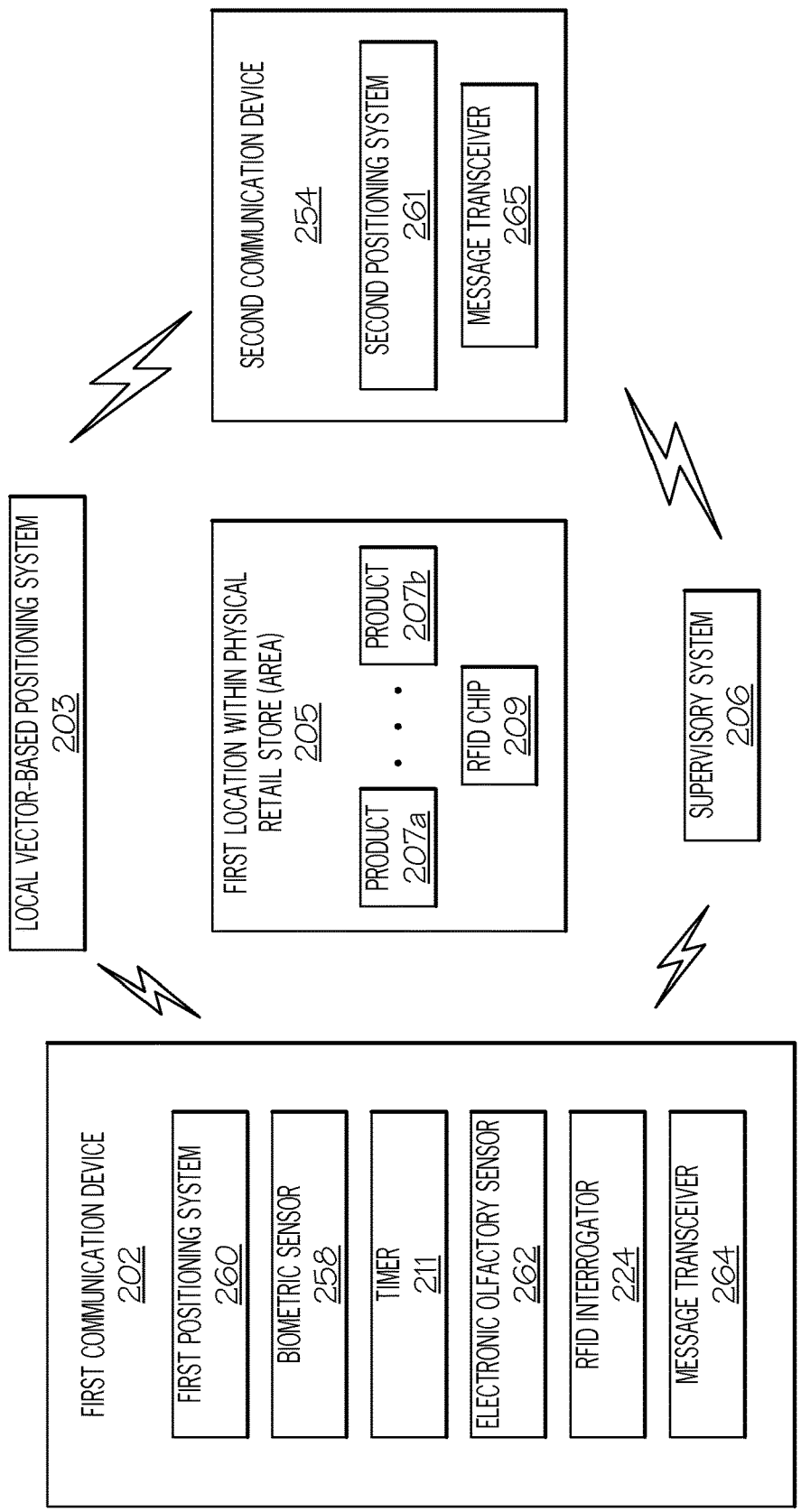
FIG. 2 illustrates a relationship between a first communication device and a second communication device in accordance with one or more embodiments of the present invention.

With reference now to FIG. 2, a relationship between a first communication device 202 (analogous to computer 102 shown in FIG. 1) and a second communication device 254 (analogous to electronic communication device 154 shown in FIG. 1) in accordance with one or more embodiments of the present invention is presented.

Assume for explanatory purposes that first communication device 202 is a mobile device, such as a smart phone. Assume further that a holder/user of the first communication device 202 is in a physical retail store. More specifically, assume that the holder/user of the first communication device 202 is in a particular aisle/department/etc. of the physical retail store, depicted in FIG. 2 as area 205. On the shelves or otherwise displayed in area 205 are multiple products 207a-207b (where "b" is an integer). In an embodiment of the present invention, all of the multiple products 207a-207b are of a same type of product (e.g., all of the multiple products 207a-207b are computers), although they may be different models from a same or different manufacturer(s).

Assume now that a user of the first communication device 202 would like to visit face-to-face with someone who has actually used/bought one of the products 207a-207b. As described herein, the present invention provides a system that allows the user of the first communication device 202 to make such a connection by co-locating with another such person. That is, the present invention 1) determines what the user of the first communication device 202 (a "shopper") is examining; 2) determines a level of interest in a particular product being demonstrated by the shopper; 3) identifies a user of a second communication device 254 (e.g., a smart phone that is analogous to the electronic communication device 154 shown in FIG. 1) within the store (or is otherwise in close physical proximity) who has bought/used the particular product in which the shopper is interested; 4) asks the user of the second communication device 254 if he/she would be willing to meet the first user at area 205; and 5) provides navigational directions to area 205 to the user of the second communication device 254.

1) Determining What the Shopper is Examining

In order to determine what product within area 205 the user of the first communication device 202 is examining, various hardware devices are utilized in one or more embodiments of the present invention, either alone or in combination.

For example, in one embodiment of the present invention, a first positioning system 260 locates the physical location of the user of the first communication device 202. The first positioning system 260 may be a GPS system (analogous to GPS 160 shown in FIG. 1), and/or first positioning system 260 may utilize a local vector-based positioning system 203 within the physical retail store. That is, an array of signal transmitters, shown collectively as local vector-based positioning system 203, transmit electronic signals to the first positioning system 260. The first positioning system 260 has an electronic signal receiver, which is able to determine the physical location of the first communication device 202 based on signal strength from one or more of the signal transmitters in the local vector-based positioning system 203, and/or Doppler shift information of signals from the array of signal transmitters in the local vector-based positioning system 203. Thus, in this embodiment, the mere fact that a shopper is standing in a particular aisle is indicative of that shopper's interest in the product(s) on that aisle.

In another embodiment of the present invention, the first positioning system 260 includes processing logic that is able to interpret data/signals/messages from other sensors that do not use GPS/triangulation as described above. Examples of such other sensors include, but are not limited to, an electronic olfactory sensor 262 and an RFID interrogator 224.

Thus, in one embodiment of the present invention, this other sensor used by the first positioning system is electronic olfactory sensor 262 (analogous to electronic olfactory sensor 162 depicted in FIG. 1), which is able to detect odorants being emitted from products 207a-207b. For example, assume that electronic olfactory sensor 262 detects a particular polyisoprene used to make tires (or a specific brand/model tire). By detecting this odorant (i.e., airborne molecules of this particular polyisoprene), the first positioning system 260 is able to determine that the shopper (i.e., user of the first communication device 202) is standing in the tire aisle of the store. Detection of other odorants by the electronic olfactory sensor 262 allows the first positioning system 260 to determine that the shopper is standing in a perfume department (by detecting perfume odorants), a shoe department (by detecting leather/rubber odorants), an electronics department (by detecting thermal grease odorants that emanate from a heat sink within a computer), etc.

In another embodiment of the present invention, this other sensor used by the first positioning system 260 to determine where the shopper is located is an RFID interrogator 224 (analogous to RFID interrogator 124 shown in FIG. 1). RFID interrogator 224 is able to interrogate RFID chips, such as RFID chip 209 shown in FIG. 2. In one embodiment, RFID chip 209 is affixed to one or more of the products 207a-207b. In another embodiment, RFID chip 209 is affixed to a particular support (e.g., a shelf) within area 205. The range of RFID interrogator 224 is limited (e.g., less than 20'). Thus, any RFID chip (e.g., RFID chip 209) detected by the RFID interrogator 224 (e.g., the RFID interrogator 224 is within 20' of the RFID chip 209) can be associated with a particular product/area, thus giving the first positioning system 260 adequate information to determine the present location of the first communication device 202 as being area 205.

2) Determining a Level of Interest in a Particular Product Being Demonstrated by the Shopper In order to determine a level of interest that a shopper has in a particular product, various processes can be utilized in accordance with different embodiments of the present invention. For example, the shopper may simply input his/her interest in a particular product onto a user interface for an application ("app") on his/her smart phone (first communication device 202).

Similarly, the shopper may send a query to an on-line service about the particular product. For example, the shopper may scan a bar code on the product, which is then read by a scanner (e.g., scanner 167 shown in FIG. 1) on the user's smart phone or similar device to identify the particular product. Once the particular product is identified, an on-line search for price comparisons, product reviews, etc. about that product can be performed from the smart phone. This act of scanning/querying, which is dependent upon the scanner 167 and connections to information (e.g., on the Internet) via the network 128 shown in FIG. 1, is indicative of the shopper's interest in that product.

However, in other embodiments of the present invention, the interest level of the shopper regarding a particular product or type of product is directly determined using a timer 211 or a biometric sensor 258.

Timer 211 is a countdown timer that starts as soon as the shopper (user of the first communication device 202) enters area 205 (as determined by first positioning system 260). If the shopper remains within area 205 for more than a predetermined length of time (e.g., more than five minutes), then logic within the first communication device 202 (e.g., executing DCLL 148 shown in FIG. 1) is able to determine that this user is interested in one or more products being displayed in area 205. This time period may be the amount of time that the shopper spends standing still versus moving, or it may reflect a past history of time spent on a particular aisle or other location associated with the particular product.

Similarly, the biometric sensor 258 is able to determine the level of interest that the shopper has in a particular product. For example, assume that the biometric sensor 258 detects a rise in blood pressure, pupil dilation, etc., indicating a heightened level of interest. Readings from biometric sensor 258 thus indicate this heightened level of interest, which is utilized by logic within the first communication device 202 (e.g., executing DCLL 148 shown in FIG. 1) to indicate that the user's interest level is greater than a predefined limit, thus causing the system to initiate contact with a previous user of that product (i.e. the user of second communication system 254).

In another embodiment of the present invention, an Internet search history of the shopper may indicate the shopper's interest in the particular product. For example, the Internet search history on the shopper's smart phone (e.g., computer 102 shown in FIG. 1), which preferably is accessible/available only to the shopper, is in indicative of an interest in a particular product.

In another embodiment of the present invention, coupons loaded on the shopper's smart phone may indicate the shopper's interest in the particular product. For example, assume that the shopper has a coupon for the particular product loaded on his/her smart phone (e.g., computer 102 shown in FIG. 1). This coupon is indicative of the shopper's past investigation of or interest in the particular product, which is in indicative of the shopper's current interest in a particular product.

3) Identifying a User of the Second Communication Device

The user of the second communication device 254 is a person who has bought, used, or otherwise has personal knowledge about a product (from products 207a-207b) that the user of first communication device 202 is interested in. In order to identify that person (i.e., to identify a person who actually has bought/used this product), a supervisory system 206 (which is in wireless communication with the first communication device 202 and/or the second communication device 254 and/or the local vector-based positioning system 203) and/or the first communication device 202 interrogates the database stored in database storage system 152 for identities of persons that 1) have previously signed up to participate in the process described herein, 2) meet the criteria of having purchased and/or used a particular product, and 3) are within or nearby the physical retail store within which area 205 is located. That is, the database stored in database storage system 152 contains the identification of persons that have bought/used products being displayed in area 205, as well as the identification of the second communication device 254 that they use, as well as their current location (e.g., through the use of GPS 160 shown in FIG. 1).

In one or more embodiments, people that have knowledge about the particular product are identified as those persons who have critiqued the particular product on a product website and/or a social networking site.

Note that only persons who have intentionally and voluntarily downloaded an application onto their smart phone (e.g., second communication device 254) that indicates their willingness to be "subject matter experts" on certain products that they have bought, used, etc. will be found in this database.

In one embodiment, the application (e.g., part of DCLL 148 depicted in FIG. 1) is limited to a particular location and/or store. For example, the application may be active only when a second positioning system 260 determines that the previous buyer/user is currently within the physical store in which area 205 is located.

Thus, the identity of the person who has bought/used a particular product displayed in area 205, as well as the identity of the second communication device 254 (e.g., a phone number of the smart phone that is second communication device 254) is available to the first communication device 202, assuming that the user of the second communication device 254 has affirmatively enrolled in the process described herein, thereby volunteering to assist shoppers that are looking at certain products within the physical store.

4) Asking the User of the Second Communication Device if He/She Would be Willing to Meet the First User Once the identity of the past user/owner of the product and his/her phone (second communication device 254) have been correlated with a product that the user of the first communication device 202 is considering for purchase, the message transceiver 264 in the first communication device 202 will send a request message to the message transceiver 265 in the second communication device 254. This request message asks the user of the second communication device 254 if he/she would be willing to come to area 205 and assist the user of the first communication device 202 in his/her decision making process regarding the purchase of one of the products 207a-207b.

5) Providing Navigational Directions to Area 205

If the user of the second communication device 254 agrees to help the user of the first communication device 202 in deciding which product in area 205 to purchase, directions are then sent by the supervisory system 206 and/or the first communication device 202 to the second communication device 254, directing the user of the second communication device 254 to area 205. In one embodiment, these directions are merely a description of the department/aisle on which the user of the first communication device 202 is located. That is, just the name of the aisle/department is given, such that the user of the second communication device 254 must find the aisle/department that is area 205 using posted physical signage. In another embodiment, the position of area 205 is derived by the first positioning system 260 utilizing the equipment (e.g., GPS, electronic olfactory sensor, etc.) described herein, and then sending geographic coordinates (e.g., GPS coordinates) to the second communication device 254, which then auto-navigates the user of the second communication device 254 to area 205. In another embodiment, specific directions (distance and direction) are given to the second communication device 254 based on the relative positions of the first communication device 202 and the second communication device 254, as respectively determined by the first positioning system 260 and the second positioning system 261.

Figure 3:
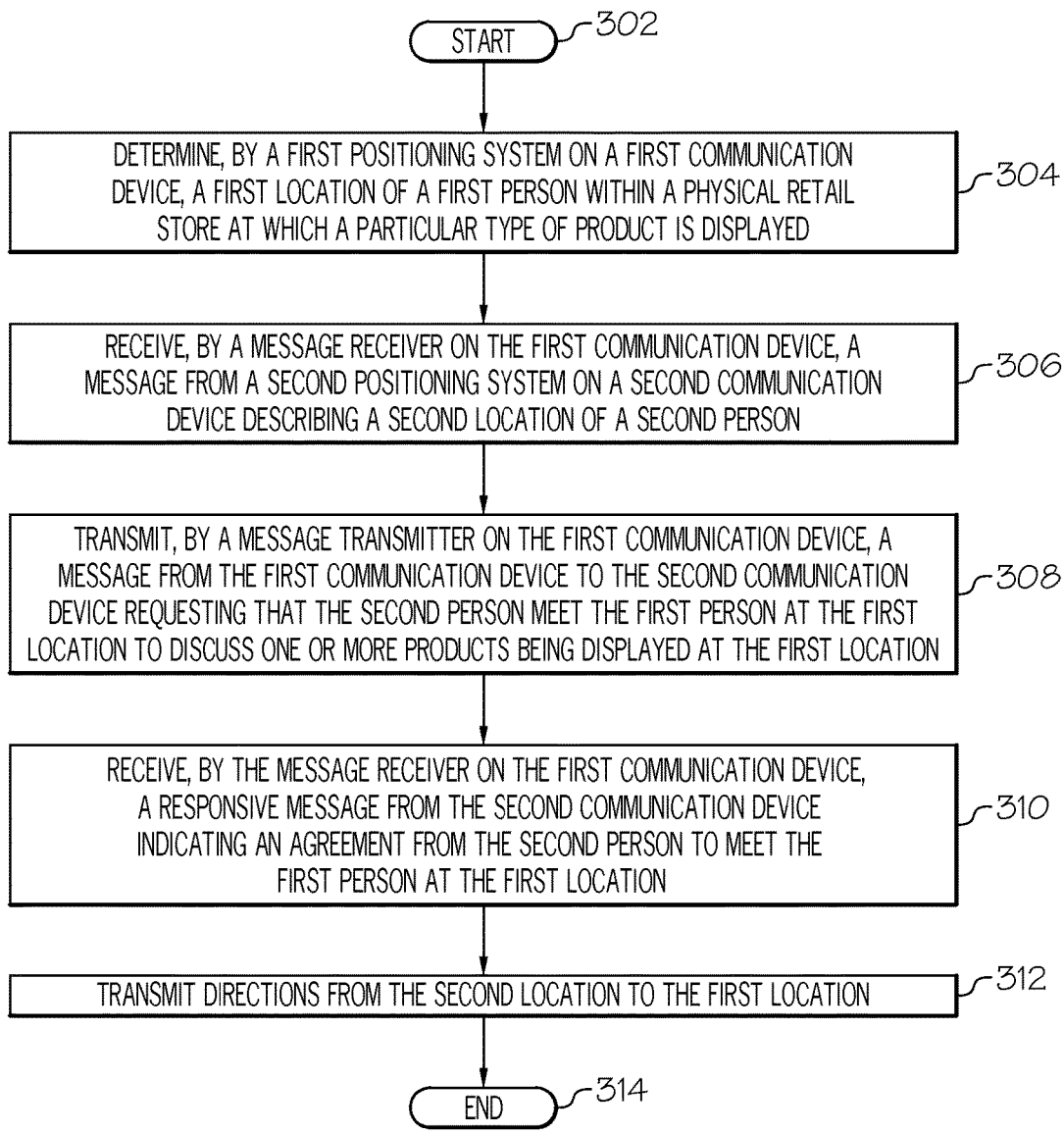
FIG. 3 is a high-level flow chart of one or more steps performed by electronic device(s) to co-locate two subject-related persons.

With reference now to FIG. 3, a high-level flow chart of one or more steps performed by electronic device(s) to co-locate two subject-related persons is presented.

After initiator block 302, a first positioning system (e.g., first positioning system 260 shown in FIG. 2) on a first communication device (e.g., first communication device 202 shown in FIG. 2) determines a first location of a first person who is using the first communication device, as described in block 304. The first location is a location (e.g., area 205 shown in FIG. 2) within a physical retail store at which a particular type of product (e.g., one of the products 207a-207b shown in FIG. 2) is displayed.

As described in block 306, a message receiver (e.g., message transceiver 264 shown in FIG. 2) on the first communication device receives a message from a second positioning system (e.g., second positioning system 261 shown in FIG. 2) on a second communication device (e.g., second communication device 254 shown in FIG. 2) describing a second location of a second person. As described herein, the second person has been predetermined to have used a product from the particular type of product that is displayed at the first location.

As described in block 308, a message transmitter (e.g., message transceiver 264 shown in FIG. 2) on the first communication device transmits a message from the first communication device to the second communication device requesting that the second person meet the first person at the first location to discuss one or more products being displayed at the first location.

As described in block 310, the message receiver on the first communication device receives a responsive message from the second communication device indicating an agreement from the second person to meet the first person at the first location.

As described in block 312, the message transmitter on the first communication device then transmits, to the second communication device, navigational directions from the second location to the first location.

The flow-chart from FIG. 3 ends at terminator block 314.

In an embodiment of the present invention, the first positioning system is a space-based satellite positioning system (i.e., is a GPS system).

In an embodiment of the present invention, the first positioning system is a local vector-based positioning system (e.g., local vector-based positioning system 203 shown in FIG. 2).

In an embodiment of the present invention, the first communication device receives messages from one or more biometric sensors (e.g., biometric sensor 258 shown in FIG. 2). These biometric sensors detect biometric features being exhibited in real-time by the first person while examining the one or more products being displayed at the first location. In order to determine that the biometric readings are being taken while the shopper is examining (either physically holding or simply looking at) a particular product, a camera (e.g., camera 156) can track where the shopper is looking Otherwise, the shopper merely being proximate to the product (as determined by the positioning system) will indicate that the shopper is examining the product.

As described herein, the first communication device determines a level of interest that the first person has in the one or more products being displayed at the first location based on the messages from the one or more biometric sensors (e.g., biometric sensor 258 described herein). In response to a determined level of interest of the first person in the one or more products being displayed exceeding a predetermined level, transmission of the message from the first communication device to the second communication device requesting that the second person meet the first person at the first location is authorized by the first communication device 202 and/or the supervisory system 206. Alternatively, in response to a determined level of interest of the first person in the one or more products being displayed being less than a predetermined level, then the first communication device 202 and/or the supervisory system 206 may block transmission of the message from the first communication device to the second communication device requesting that the second person meet the first person at the first location.

In one embodiment of the present invention, the first communication device receives a time-on-station message from a timer (e.g., timer 211 shown in FIG. 2) and the first positioning system. The time-on-station message indicates how long the first person has been examining the one or more products being displayed at the first location. The first communication device (and/or the supervisory system) determines a level of interest of the first person in the one or more products being displayed at the first location based on the time-on-station message. That is, the level of interest is determined to rise as a time-on-station of the first person at the first location increases. In response to a determined level of interest of the first person in the one or more products being displayed product exceeding a predetermined level, then the first communication device 202 and/or the supervisory system 206 authorizes transmission of the message from the first communication device to the second communication device requesting that the second person meet the first person at the first location. Alternatively, in response to a determined level of interest of the first person in the one or more products being displayed product falling below a predetermined level, then the first communication device 202 and/or the supervisory system block transmission of the message from the first communication device to the second communication device requesting that the second person meet the first person at the first location.

In one embodiment of the present invention, the first communication device receives messages from one or more electronic olfactory sensors (e.g., electronic olfactory sensor 262 shown in FIG. 2). The one or more electronic olfactory sensors detect odorants being emitted by the one or more products being displayed at the first location. The first communication device (and/or the supervisory system) then further determines the first location of the first person by matching odorants detected by the one or more electronic olfactory sensors to a database of odorants found with the one or more products being displayed at the first location.

In one embodiment of the present invention, a radio frequency identifier (RFID) interrogator (e.g., RFID interrogator 224 shown in FIG. 2) on the first communication device interrogates one or more RFID chips (e.g., RFID chip 209 shown in FIG. 2) affixed to the one or more products being displayed at the first location and/or to a fixed support, such as a shelf within area 205 shown in FIG. 2. The first communication device then further determines the first location of the first person by matching received RFID signals to a database of locations of RFID chips affixed to the one or more products being displayed at the first location within the physical retail store (or locations of RFID chips affixed to shelving).

In one embodiment of the present invention, the first communication device (or the supervisory system 206) determines (e.g., using the first positioning system 260 and the second positioning system 261 shown in FIG. 2) that the first location and the second location are farther apart than a predetermined distance (e.g., more than 200'). In response to determining, by the first communication device, that the first location and the second location are farther apart than the predetermined distance, then the first communication device 202 and/or the supervisory system 206 will block transmission of the message from the first communication device to the second communication device requesting that the second person meet the first person at the first location. That is, if the second person is too far away to reasonably ask him/her to come to area 205 shown in FIG. 2, then the second person will not be contacted. However, if the second person is close enough (i.e., in response to determining, by the first communication device, that the first location and the second location are closer together than the predetermined distance), then the first communication device 202 and/or the supervisory system 206 will authorize the transmission of the message from the first communication device to the second communication device requesting that the second person meet the first person at the first location.

In one embodiment of the present invention, the first location and the second location are beyond a human vocal communication range, and the first location and the second location are not within a visual line of sight. That is, the first person (standing in area 205) and the second person (located some distance away) are so far removed from one another that the first person could not possibly simply call out to (or look for) the second person, assuming that the first person even knew what the second person looked like (or even who the second person is). Thus, the present invention is dependent upon the hardware devices described herein in one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of electronic sensors co-locating two subject-related persons, the method comprising:
    determining, by a first positioning system on a first communication device, a first location of a first person who is using the first communication device, wherein the first location is a location within a physical retail store at which a particular type of product is displayed;
    receiving, by a message receiver on the first communication device, a message from a second positioning system on a second communication device describing a second location of a second person, wherein the second person has been predetermined to have used a product from the particular type of product that is displayed at the first location;
    transmitting, by a message transmitter on the first communication device, a message from the first communication device to the second communication device requesting that the second person meet the first person at the first location to discuss one or more products being displayed at the first location;
    receiving, by the message receiver on the first communication device, a responsive message from the second communication device indicating an agreement from the second person to meet the first person at the first location;
    transmitting, from the message transmitter on the first communication device to the second communication device, navigational directions from the second location to the first location;
    receiving, by the first communication device, messages from one or more biometric sensors, wherein the one or more biometric sensors detect biometric features being exhibited in real-time by the first person while examining the one or more products being displayed at the first location;
    determining, by the first communication device, a level of interest that the first person has in the one or more products being displayed at the first location based on the messages from the one or more biometric sensors; and
    in response to a determined level of interest of the first person in the one or more products being displayed being less than a predetermined level, blocking transmission of the message from the first communication device to the second communication device requesting that the second person meet the first person at the first location.

2. The method of claim 1, wherein the first positioning system is a space-based satellite positioning system.

3. The method of claim 1, wherein the first positioning system is a local vector-based positioning system.

4. The method of claim 1, further comprising:
    receiving, by the first communication device, messages from one or more biometric sensors, wherein the one or more biometric sensors detect biometric features being exhibited in real-time by the first person while examining the one or more products being displayed at the first location;
    determining, by the first communication device, a level of interest that the first person has in the one or more products being displayed at the first location based on the messages from the one or more biometric sensors; and
    in response to a determined level of interest of the first person in the one or more products being displayed exceeding a predetermined level, authorizing transmission of the message from the first communication device to the second communication device requesting that the second person meet the first person at the first location.

5. The method of claim 1, further comprising:
    receiving, by the first communication device, a time-on-station message from a timer and the first positioning system, wherein the time-on-station message indicates how long the first person has been examining the one or more products being displayed at the first location;
    determining, by the first communication device, a level of interest that the first person has in the one or more products being displayed at the first location based on the time-on-station message, wherein the level of interest is determined to rise as a time-on-station of the first person at the first location increases; and
    in response to a determined level of interest of the first person in the one or more products being displayed exceeding a predetermined level, authorizing transmission of the message from the first communication device to the second communication device requesting that the second person meet the first person at the first location.

6. The method of claim 1, further comprising:
    receiving, by the first communication device, a time-on-station message from a timer and the first positioning system, wherein the time-on-station message indicates how long the first person has been examining the one or more products being displayed at the first location;

determining, by the first communication device, a level of interest that the first person has in the one or more products being displayed at the first location based on the time-on-station message, wherein the level of interest is determined to rise as a time-on-station of the first person at the first location increases; and in response to a determined level of interest of the first person in the one or more products being displayed falling below a predetermined level, blocking transmission of the message from the first communication device to the second communication device requesting that the second person meet the first person at the first location.

7. The method of claim 1, further comprising:

receiving, by the first communication device, messages from one or more electronic olfactory sensors, wherein the one or more electronic olfactory sensors detect odorants being emitted by the one or more products being displayed at the first location; and further determining, by the first communication device, the first location of the first person by matching odorants detected by the one or more electronic olfactory sensors to a database of odorants found with the one or more products being displayed at the first location.

8. The method of claim 1, further comprising:

interrogating, by a radio frequency identifier (RFID) interrogator on the first communication device, one or more RFID chips affixed to the one or more products being displayed at the first location; and further determining, by the first communication device, the first location of the first person by matching received RFID signals to a database of locations of RFID chips affixed to the one or more products being displayed at the first location within the physical retail store.

9. The method of claim 1, further comprising:

interrogating, by a radio frequency identifier (RFID) interrogator on the first communication device, one or more RFID chips affixed to a product display shelf at the first location; and further determining, by the first communication device, the first location of the first person by matching received RFID signals to a database of locations of RFID chips affixed product display shelves within the physical retail store.

10. The method of claim 1, further comprising:

determining, by the first communication device, that the first location and the second location are farther apart than a predetermined distance; and in response to determining, by the first communication device, that the first location and the second location are farther apart than the predetermined distance, blocking transmission of the message from the first communication device to the second communication device requesting that the second person meet the first person at the first location.

11. The method of claim 1, further comprising:

determining, by the first communication device, that the first location and the second location are closer together than a predetermined distance; and in response to determining, by the first communication device, that the first location and the second location are closer together than the predetermined distance, authorizing transmission of the message from the first communication device to the second communication device requesting that the second person meet the first person at the first location.

12. The method of claim 1, wherein the first location and the second location are beyond a human vocal communication range, and wherein the first location and the second location are not within a visual line of sight.

13. A computer program product for co-locating subject-related persons, the computer program product comprising a non-transitory computer readable storage medium having program code embodied therewith, wherein the non-transitory computer readable storage medium is not a transitory signal per se, and wherein the program code is readable and executable by a processor to perform a method comprising:

determining, by a first positioning system on a first communication device, a first location of a first person who is using the first communication device, wherein the first location is a location within a physical retail store at which a particular type of product is displayed;

receiving, by a message receiver on the first communication device, a message from a second positioning system on a second communication device describing a second location of a second person, wherein the second person has been predetermined to have used a product from the particular type of product that is displayed at the first location;

transmitting, by a message transmitter on the first communication device, a message from the first communication device to the second communication device requesting that the second person meet the first person at the first location to discuss one or more products being displayed at the first location;

receiving, by the message receiver on the first communication device, a responsive message from the second communication device indicating an agreement from the second person to meet the first person at the first location;

transmitting, from the message transmitter on the first communication device to the second communication device, navigational directions from the second location to the first location;

receiving, by the first communication device, messages from one or more biometric sensors, wherein the one or more biometric sensors detect biometric features being exhibited in real-time by the first person while examining the one or more products being displayed at the first location;

determining, by the first communication device, a level of interest of that the first person has in the one or more products being displayed at the first location based on the messages from the one or more biometric sensors; and in response to a determined level of interest of the first person in the one or more products being displayed being less than a predetermined level, blocking transmission of the message from the first communication device to the second communication device requesting that the second person meet the first person at the first location.

14. The computer program product of claim 13, wherein the method further comprises:

receiving, by the first communication device, a time-on-station message from a timer and the first positioning system, wherein the time-on-station message indicates how long the first person has been examining the one or more products being displayed at the first location;

determining, by the first communication device, a level of interest that the first person has in the one or more products being displayed at the first location based on the time-on-station message, wherein the level of interest is determined to rise as a time-on-station of the first person at the first location increases; and in response to a determined level of interest of the first person in the one or more products being displayed falling below a predetermined level, blocking transmission of the message from the first communication device to the second communication device requesting that the second person meet the first person at the first location.

15. The computer program product of claim 13, wherein the method further comprises:

receiving messages from one or more electronic olfactory sensors, wherein the one or more electronic olfactory sensors detect odorants being emitted by the one or more products being displayed at the first location; and further determining the first location of the first person by matching odorants detected by the one or more electronic olfactory sensors to a database of odorants found within the one or more products being displayed at the first location.

16. The computer program product of claim 13, wherein the method further comprises:

interrogating, by a radio frequency identifier (RFID) interrogator on the first communication device, one or more RFID chips affixed to the one or more products being displayed at the first location; and further determining the first location of the first person by matching received RFID signals to a database of locations of RFID chips affixed to the one or more products being displayed at the first location within the physical retail store.

17. The computer program product of claim 13, wherein the method further comprises:

determining that the first location and the second location are farther apart than a predetermined distance; and in response to determining that the first location and the second location are farther apart than the predetermined distance, blocking transmission of the message from the first communication device to the second communication device requesting that the second person meet the first person at the first location.

18. A communication device comprising:
a first positioning system;
a message receiver; and
a message transmitter;

wherein the communication device is a first communication device, wherein the first positioning system on a first communication device determines a first location of a first person who is using the first communication device, wherein the first location is a location within a physical retail store at which a particular type of product is displayed;

wherein the message receiver on the first communication device receives a message from a second positioning system on a second communication device describing a second location of a second person, wherein the second person has been predetermined to have used a product from the particular type of product that is displayed at the first location;

wherein the message transmitter on the first communication device transmits a message from the first communication device to the second communication device requesting that the second person meet the first person at the first location to discuss one or more products being displayed at the first location;

wherein the message receiver on the first communication device receives a responsive message from the second communication device indicating an agreement from the second person to meet the first person at the first location;

wherein the message transmitter on the first communication device transmits, to the second communication device, navigational directions from the second location to the first location;

wherein the first communication device receives messages from one or more biometric sensors, wherein the one or more biometric sensors detect biometric features being exhibited in real-time by the first person while examining the one or more products being displayed at the first location;

wherein the first communication device determines a level of interest of that the first person has in the one or more products being displayed at the first location based on the messages from the one or more biometric sensors; and wherein the message transmitter, in response to a determined level of interest of the first person in the one or more products being displayed being less than a predetermined level, is adjusted to block transmission of the message from the first communication device to the second communication device requesting that the second person meet the first person at the first location.

* * * * *